United States Patent [19]
Leupold et al.

[11] Patent Number: 5,280,209
[45] Date of Patent: Jan. 18, 1994

[54] PERMANENT MAGNET STRUCTURE FOR USE IN ELECTRIC MACHINERY

[75] Inventors: Herbert A. Leupold, Eatontown; Ernest Potenziani, II, Ocean, both of N.J.

[73] Assignee: The United States of America as represented by the Secretary of the Army, Washington, D.C.

[21] Appl. No.: 436,406

[22] Filed: Nov. 14, 1989

[51] Int. Cl.$^5$ .................. H02K 21/26; H02K 21/12; H01F 7/02
[52] U.S. Cl. .................. 310/156; 310/154; 335/306
[58] Field of Search .................. 335/301, 209, 306; 310/46, 152, 154, 156

[56] References Cited

U.S. PATENT DOCUMENTS

| H 693 | 10/1989 | Leupold | 335/306 |
|---|---|---|---|
| 3,168,686 | 2/1965 | King et al. | 335/306 |
| 3,205,415 | 9/1965 | Seki et al. | 335/301 |
| 3,334,254 | 8/1967 | Kober | 310/156 |
| 3,768,054 | 10/1973 | Neugebauer | 335/306 |
| 4,645,961 | 2/1987 | Malsky | 310/156 |
| 4,839,059 | 6/1989 | Leupold | 335/301 |
| 4,862,128 | 8/1989 | Leupold | 335/306 |
| 4,893,103 | 1/1990 | Leupold | 335/306 |
| 5,013,951 | 5/1991 | Stadnik | 310/156 |

FOREIGN PATENT DOCUMENTS

| 91978 | 10/1961 | Denmark | 335/306 |
|---|---|---|---|
| 0177903 | 8/1987 | Japan | 335/301 |
| 0763984 | 9/1980 | U.S.S.R. | 335/209 |
| 956938 | 4/1964 | United Kingdom | 310/154 |
| 8902668 | 3/1989 | World Int. Prop. O. | 310/152 |

*Primary Examiner*—Steven L. Stephan
*Assistant Examiner*—Clayton E. LaBalle
*Attorney, Agent, or Firm*—Michael Zelenka; John M. O'Meara

[57] ABSTRACT

Magnetically rigid materials are utilized to enhance the field magnitudes produced by permanent magnet structures that are utilized in electric machinery. Magnetic circuit losses due to unnecessary magnetic fields are eliminated without employing a conventional shunt. The magnetically rigid material is cylindrically configured and magnetized to provide individual magnetic fields between sets of north and south poles on only one cylindrical surface thereof. At least one coaxial cylinder of the magnetically rigid material is included in each permanent magnet structure of the invention and each of the cylinders is constructed from a plurality of segments in one preferred embodiment thereof. Segments having a substantially triangular cross-sectional configuration are utilized in other preferred embodiments, while flux contributions from at least three segments combine to sustain each set of north and south poles in still other preferred embodiments.

6 Claims, 4 Drawing Sheets

PERMANENT MAGNET STRUCTURE FOR USE IN ELECTRIC MACHINERY

The invention described herein may be manufactured, used, and licensed by or for the Government for governmental purposes without payment to us of any royalties thereon.

BACKGROUND OF THE INVENTION

The present invention relates generally to permanent magnet structures and more particularly, to those structures which are utilized in electric machinery such as motors and generators.

As is well known in the art of electric machinery, the flux density of conventional permanent magnet structures is less than optimal due to various magnetic losses. The most common magnetic losses encountered with permanent magnet structures in electric machinery are due to flux leakage or unnecessary reluctance in the magnetic circuit thereof. When, traditional magnetic materials, such as Alnico, are utilized in these permanent magnet structures, adjacently disposed north and south poles can not be arranged on a cylindrical surface within the electric machinery without encountering flux leakage from corresponding north and south poles remotely located from that cylindrical surface. Although shunting rings can be incorporated to preclude such flux leakage in some electric machinery designs, they are very cumbersome to those designs. Pole pieces can be incorporated in those electric machinery designs where shunting rings are not possible but they only reduce such flux leakage and therefore, do not completely resolve the problem. Furthermore, as disclosed by M. Marinescu, et al in their paper entitled NEW RARE-EARTH PERMANENT MAGNET STRUCTURE FOR PRODUCING OPTIMAL MAGNETIC FIELDS IN MAGNETIC SEPARATION DEVICES, COMPARISON WITH PREVIOUS SYSTEMS; pages 163–181 of the Proceedings of the Ninth International Workshop on Rare-Earth Magnets and Their Applications, and Fifth International Symposium on Magnetic Anisotropy and Coercivity In Rare Earth-Transition Metal Alloys which were held from Aug. 31, 1987 through Sep. 3, 1987, arrangements of magnetized segments fabricated from magnetically rigid materials are also known which reduce such flux leakage but do not completely resolve the problem.

SUMMARY OF THE INVENTION

It is the general object of the present invention to provide a permanent magnet structure for use in electric machinery which precludes flux leakage from remotely located poles by eliminating such poles.

It is a specific object of the present invention to accomplish the above-stated general object for electric machinery rotors.

It is another specific object of the present invention to accomplish the above-stated general object for electric machinery stators.

These and other objects are accomplished in accordance with the present invention by magnetizing at least one cylinder of magnetically rigid (hereinafter MR) material to derive a magnetic circuit which passes externally from the cylinders through only one cylindrical surface thereof. The magnetic circuit passes through the outer cylindrical surface of the cylinders when the permanent magnet structure is for incorporation on rotors and through the inner cylindrical surface of the cylinders when the permanent magnet structure is for incorporation on stators. Each cylinder is constructed from a plurality of magnetized segments in the preferred embodiments of the invention. These segments may have various cross-sectional configurations which in the preferred embodiments are only disclosed as substantially triangular. Otherwise, the configuration of these segments may extend parallel to the longitudinal axis of the cylinder for various distances which in the preferred embodiments are only disclosed as the full length thereof.

The scope of the present invention is only limited by the appended claims for which support is predicated on the preferred embodiments hereinafter set forth in the following description and the attached drawings wherein like reference characters relate to like parts throughout the several figures.

DESCRIPTION OF THE PREFERRED EMBODIMENTS

Permanent magnet structures have many applications of which the most common is found in electric machinery, such as motors and generators. A rotor turns within a stator about the rotational axis of either a motor or generator and a clearance, called an air gap, exists therein between the rotor and stator. The magnitude of this air gap is made as small as possible to limit the reluctance encountered therein and consequently, the magnetic losses incurred therefrom. A permanent magnet structure is incorporated on either the rotor or stator and directs a magnetic field into the air gap, which interacts with the other of either the rotor or stator. In a motor, this magnetic field interacts with another magnetic field of changing polarity to develop the torque which turns the rotor while in a generator, it interacts with windings to induce current therein.

Figure 1A:
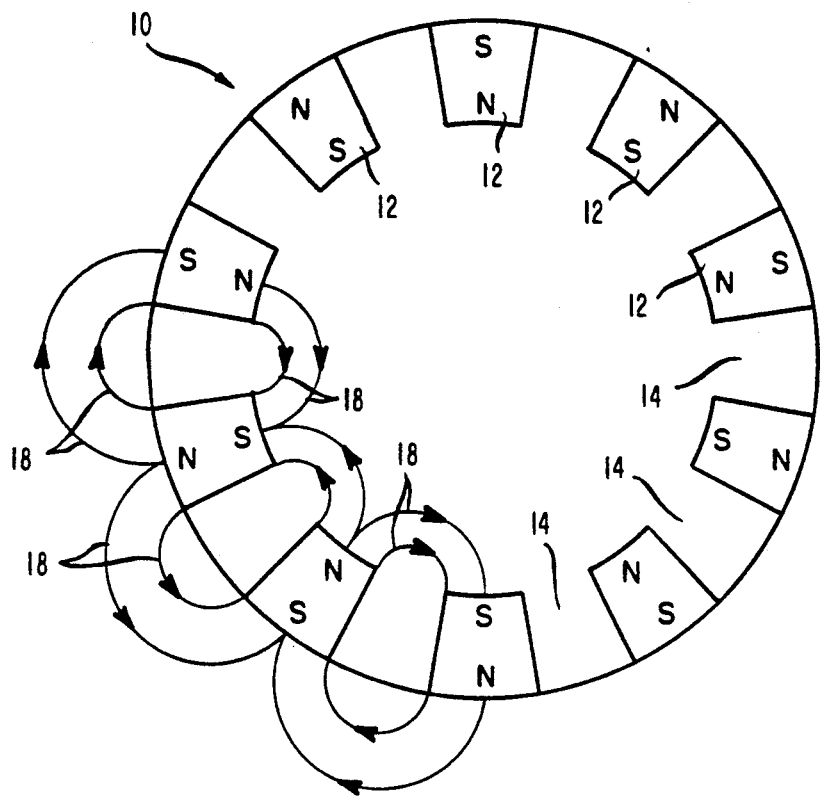
FIGS. 1a, 1b, 1c, are end views of permanent magnet structures which are commonly found in electric machinery.
Figure 1B:
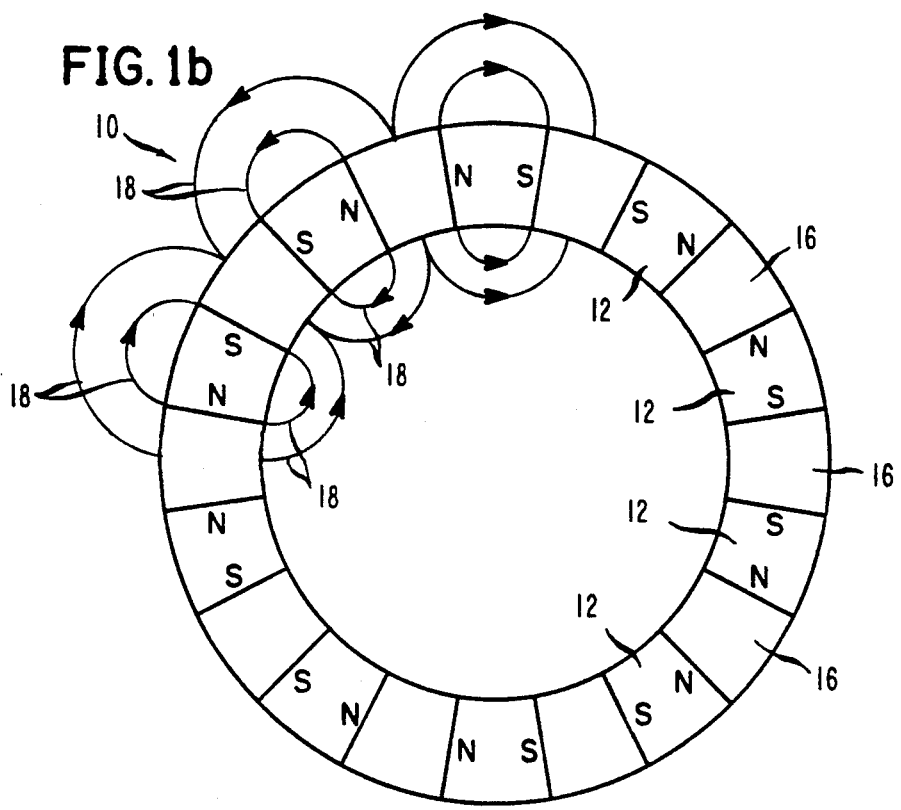

FIGS 1a and 1b illustrate different types of permanent magnet structures 10 which are conventionally utilized on either rotors or stators and in either motors or generators. Of course, all such permanent magnet structures 10 have a cylindrical configuration and include magnetic elements 12 which each have a North (hereinafter N) pole and South (hereinafter S) pole. Each magnetic element 12 serves as a source of magnetomotive force which sustains the magnetic fields that extend to and from its poles. Adjacent magnetic elements 12 are separated by air spaces 14 in FIG 1a and the poles of each magnetic element 12 therein are aligned along a cylindrical radius of the permanent magnet structure 10.

Pole pieces 16 are disposed between adjacent magnetic elements 12 in FIG 1b and the poles of each magnetic element 12 therein are aligned about the cylindrical circumference of the permanent magnet structure 10. The magnetic circuit patterns of the permanent magnet structures 10 in FIGS 1a and 1b are similar in that magnetic fields 18 extend from both the inner and outer cylindrical surfaces thereof. Of course, only the magnetic fields 18 extending from the outer cylindrical surface of the permanent magnet structures 10 are utilized on a rotor and only the magnetic fields 18 extending from the inner cylindrical surface of the permanent magnet structures 10 are utilized on a stator. Therefore, the magnetic fields 18 extending from one cylindrical surface of the permanent magnet structures 10 in FIGS. 1a and 1b are unnecessary and only add magnetic losses in the magnetic circuit thereof, due to the reluctance encountered thereby.

Figure 1C:
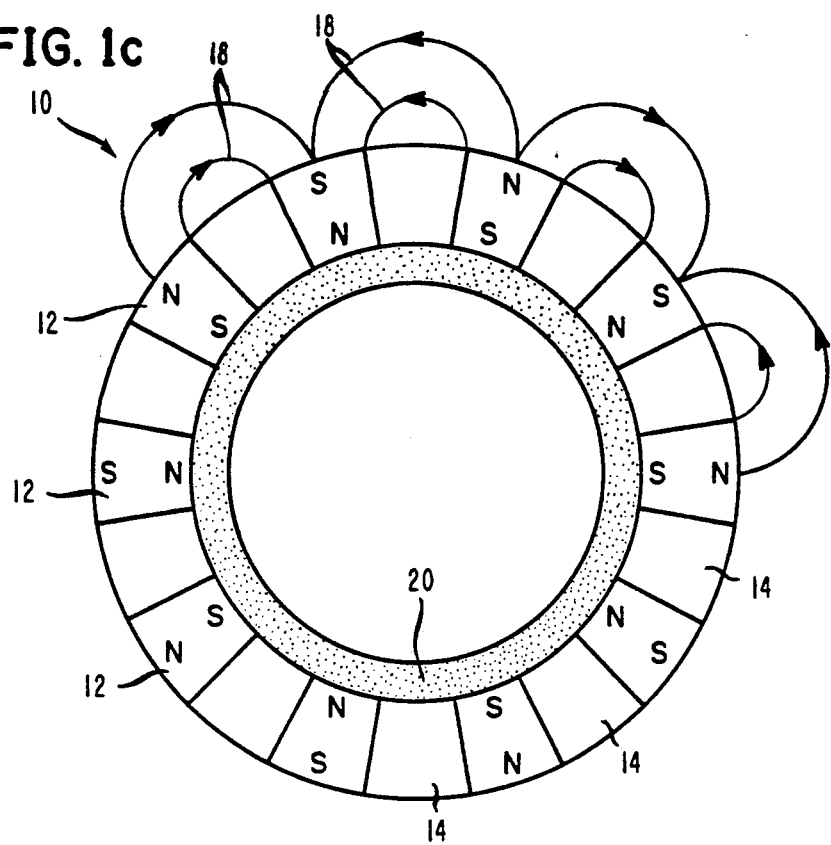

Such magnetic losses may be precluded for some conventional arrangements of magnetic elements 12 by shunting the unnecessary magnetic fields 18 out of the magnetic circuit, as illustrated in FIG. 1c for the permanent magnet structure 10 of FIG 1a. Iron or any other material with high permeance is disposed as a shunting means 20 in FIG 1c and the permanent magnet structure 10 thereof would be for incorporation on a rotor because the magnetic fields 18 to be utilized extend from the outer cylindrical surface thereof. Of course, the shunting means 20 could be disposed to shunt out the magnetic fields 18 extending from the outer cylindrical surface on the permanent magnet structure 10 of FIG 1c, which would then be for incorporation on a stator because the magnetic fields 18 to be utilized would then extend from the inner cylindrical surface thereof. However, the shunting means 20 is not a welcomed addition to electric machinery because it increases the overall dimensions, weight and cost thereof. Furthermore, the shunting means 20 can not be applied to preclude magnetic losses due to unnecessary magnetic fields 18 in all conventional arrangements of magnetic elements 12, in the permanent magnet structures 10. This can readily be understood from the permanent magnet structure 10 of FIG 1b for which shunting the magnetic fields 18 that extend from either the inner or outer cylindrical surfaces thereof, serves to shunt the magnetic fields 18 that extend from both the inner and outer cylindrical surfaces thereof. Another way of explaining this is that each magnetic element 12 in the permanent magnet structure 10 of FIG. 1b would thereby have its N pole shunted to it S pole regardless of whether the shunting means 20 was disposed against the inner or outer cylindrical surface thereof. Of course, the pole pieces 16 in the permanent magnet structure 10 of FIG. 1b do serve to limit the magnetic losses by reducing the reluctance encountered by the magnetic fields 18 passing between the N poles and S poles however, they in no way preclude the magnetic losses which result from the unnecessary magnetic fields 18.

Figure 2:
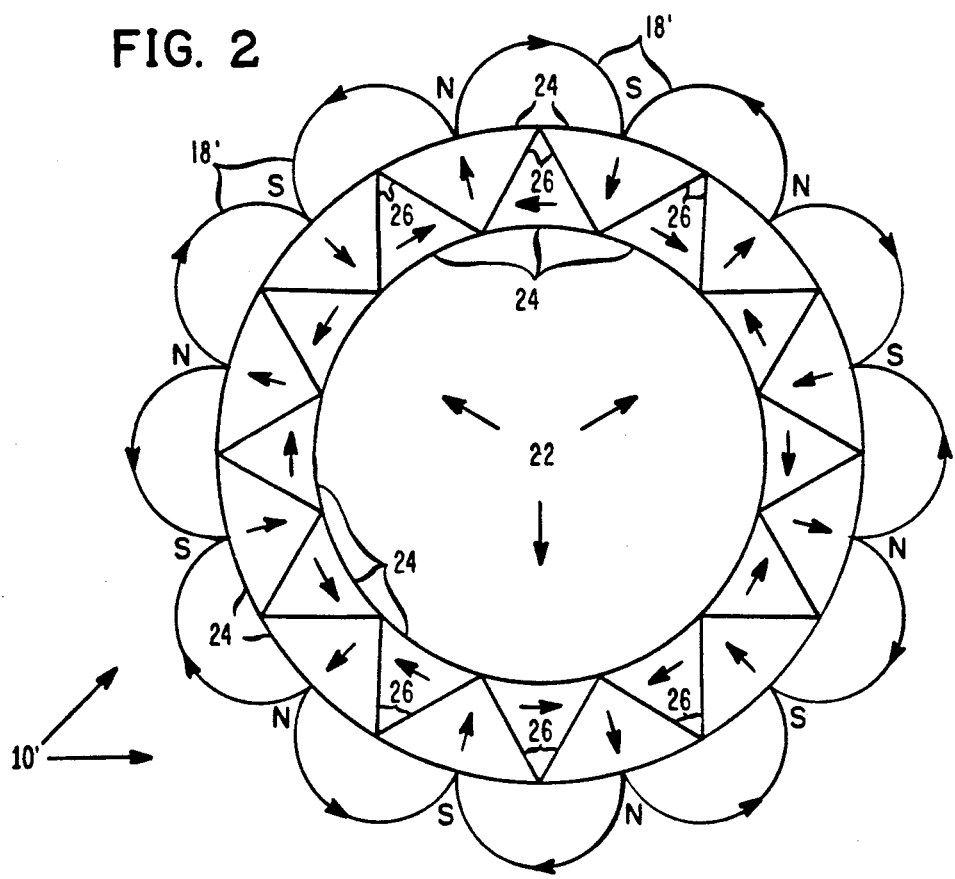
FIG. 2 is an end view of a permanent magnet structure in accordance with the invention and of the type which incorporates on a rotor in electric machinery.

A permanent magnet structure 10' in accordance with one preferred embodiment of the present invention, is illustrated in FIG. 2. The magnetic losses caused in electric machinery by the unnecessary magnetic fields 18 which extend from conventional permanent magnet structures 10, as explained above relative to FIGS 1a and 1b, are eliminated in the magnet structure 10' without incorporating the shunting means 20. At least one hollow cylinder 22 of MR material is included in the magnet structure 10'. The cylinders 22 are magnetized to derive magnetic fields 18' which extend from only one cylindrical surface thereof. Because the magnetic fields 18' extend from the outer cylindrical surface in FIG. 2, the magnet structure 10' therein would be for incorporation on the rotor of electric machinery. However, the magnetic fields 18' could extend from the inner cylindrical surface of the magnet structure 10', which would then be for incorporation on the stator of electric machinery as is discussed hereinafter relative to the magnet structure 10' of FIG. 4.

As is apparent from U.S. Pat. No. 4,837,542 which issued on Jun. 6, 1989 to Herbert A. Leupold, a co-applicant hereto, and the publication of K. Halbach referenced in that patent, MR materials are well known to those skilled in the magnetic arts. Some ferrites, for example particular Barium Ferrites, and rare-earth alloys, for example Neodymium-Iron-Boron and Rare Earth Cobalts such as Samarium Cobalt or Cerium Cobalt, have been utilized or are being contemplated for use as MR materials. The most pronounced characteristic of MR materials is their very high coercivity (field magnitude required to demagnetize) relative to that of traditional magnetic materials. This characteristic may be viewed as the means by which various magnetic circuit effects can be attained with MR materials that are unattainable with traditional magnetic materials, for example field transparency and flux path predictability. As to the former, external magnetic fields up to some magnitude greater than the remanence (magnetized level) of MR material will pas therethrough without affecting the magnetic orientation thereof. A resultant field therefore occurs as the vector sum of the external field and the field sustained by the MR material. As to the latter, the magnitude and direction of the magnetization is constant throughout any individual piece of MR material, which facilitates the construction of field sources for sustaining magnetic circuits that include unconventional flux paths and even a magnetic circuit configured to confine a magnet field in a cavity.

Figure 3:
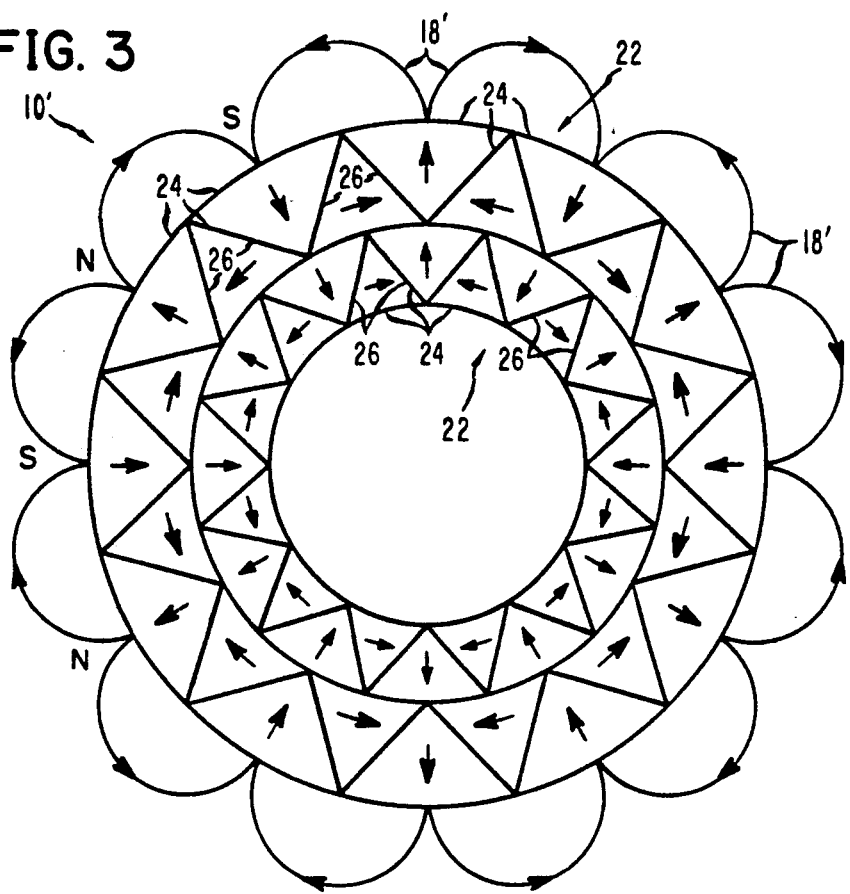
FIG. 3 is an end view of another permanent magnet structure in accordance with the invention and of the type which incorporates on a rotor in electric machinery.
Figure 4:
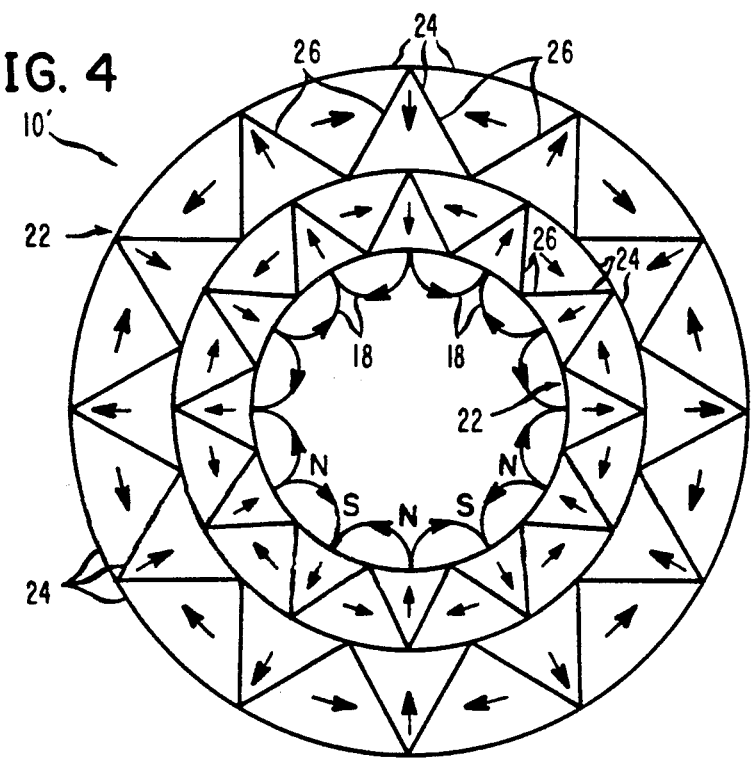
FIG. 4 is an end view of still another permanent magnet structure in accordance with the invention and of the type which incorporates on a stator in electric machinery.
Figure 5:
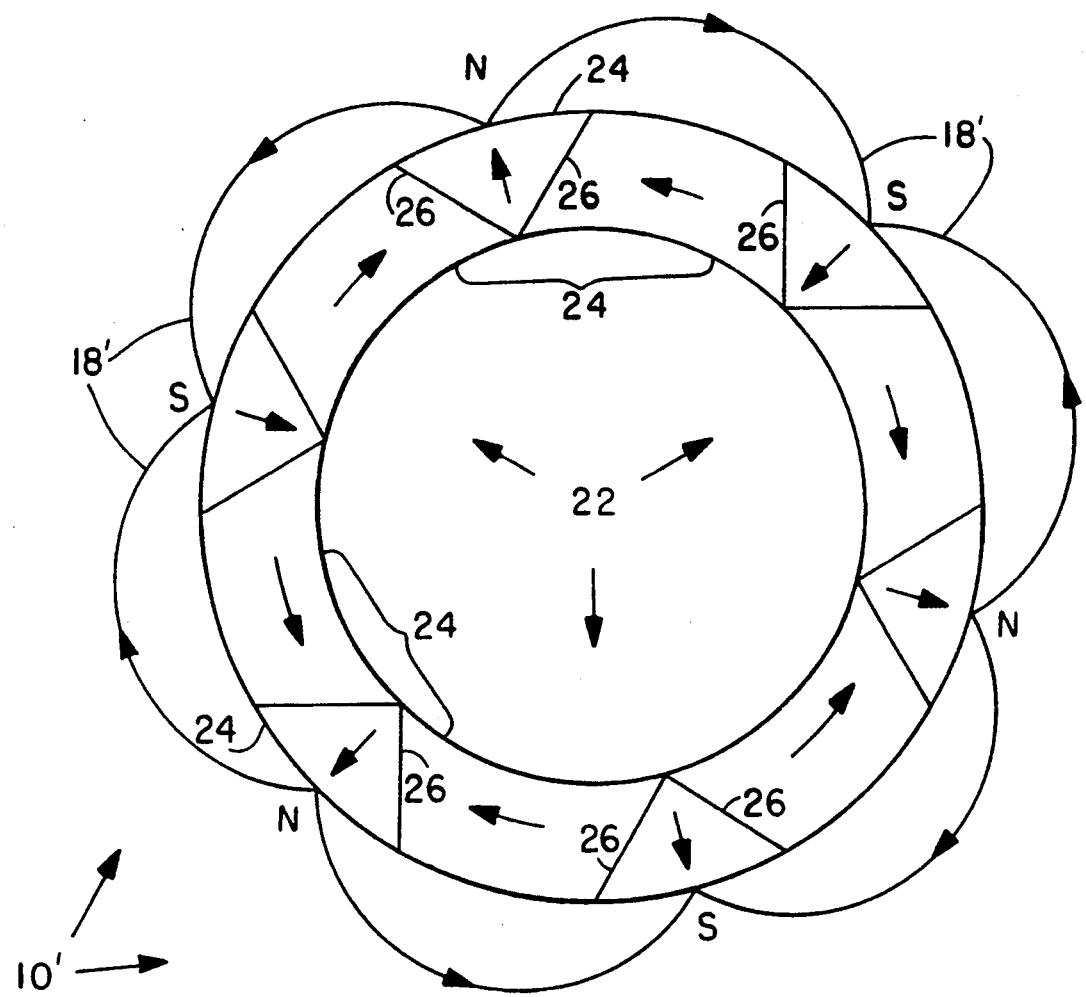
FIG. 5 is an end view of a further permanent magnet structure in accordance with the invention and of similar type to that of FIG. 2.

Because it is not yet practical to magnetize cylinders 22 that are fabricated as a single piece of MR material, each cylinder 22 is constructed from a plurality of MR material segments 24. Each such segment 24 extends longitudinally for the full length of its cylinder 22, in the preferred embodiments of the invention, however, only a partial extention therealong is certainly possible in other embodiments. Although segments 24 having other cross-sectional configurations could be utilized in various embodiments of the invention, only segments 24 having substantially triangular and trapezoidal cross-sectional configurations are disclosed herein. Furthermore, the segments 24 in the cylinders 22 of FIGS. 2, 3 and 4 are configured and arranged to provide six sets of N and S poles, as shown in FIG. 5 but could be arranged to either increase or decrease this number of N and S poles. The magnitude and direction of the magnetization in each segment 24 are constant due substantially to the high coercivity of its MR material, and the vector representation thereof is given by an arrow which extends from the S pole to the N pole in each segment 24. Fabrication of each segment 24 could be accomplished with the configuration thereof first being obtained by pressing the MR material and then applying the magnetism thereto using any of the well known magnetization techniques.

As shown in FIG. 2, the segments 24 in each cylinder 22 are arranged according to the number of N and S poles which are required in the magnetic circuit to establish the desired number of independent magnetic fields 18'. Of course, the N and S poles on the magnet structure 10' are alternately disposed thereabout, with each magnetic field 18' extending externally therefrom between adjacently disposed N and S poles thereon. Each such magnetic field 18' is sustained by a combination of at least three segments 24 in each cylinder 22. At least one segment 24 passes the magnetic circuit from the magnet structure 10' in a radial direction through one cylindrical surface thereof, at the N pole of that magnetic field 18'; at least one segment 24 receives the magnetic circuit into the magnet structure 10' in a radial direction through the same cylindrical surface thereof, at the S pole of that magnetic field 18'; and at least one segment 24 passes the magnetic circuit within the magnet structure 10' between at least the other two segments 24, in a direction tangent to the cylindrical surface other than that cylindrical surface from which the magnetic fields 18' extend. However, as explained previously herein at the bottom of page 5, as will be readily understood from FIG. 2, each segment 24 which passes the magnetic circuit in a radial direction is the terminus for two separate magnetic fields 18' and therefore on an effectual basis, each magnetic field 18' is sustained by a minimum of two segments 24. Furthermore, when all segments 24 are substantially triangular in cross section, those segments 24 which direct the magnetic circuit radially in each cylinder 22 are configured and arranged for external exposure on only one cylindrical surface thereof, while those segments 24 which direct the magnetic circuit tangentially in each cylinder 22 are configured and arranged for external exposure on only the other cylindrical surface thereof. Therefore, the magnetic fields 18' extend from only one cylindrical surface on the magnet structure 10' and consequently, magnetic losses caused by unnecessary magnetic fields are eliminated in the magnetic circuit thereof, without employing any shunting means 20.

The direction of the magnetic circuit through each cylinder 22 changes abruptly at each boundary 26 between adjacent segments 24, such as shown in FIG. 2 where one is magnetized in the radial direction and the other is magnetized in the tangential direction. The orientations of the boundaries 26 are such that the vector components of magnetization perpendicular thereto in the segments 24 on either side thereof have equal and opposite magnitudes. This ensures that the net pole density along each boundary 26 is zero because such equal and opposite perpendicular components of magnetization induce equal and opposite pole densities. For practical purposes, the magnetic structure 10' sustains no poles on the inner surface of rotors or outer surface of stators because the magnetization thereacross is substantially tangential to those surfaces and consequently, pole-inducing perpendicular components are nonexistent thereacross. Of course, this is not absolutely true in FIG. 2 where the segments 24 are cross-sectionally configured to have circular arcs on the outer or inner cylinder surface of interest, but would be absolutely true if those segments 24 were cross-sectionally configured to have circular chords on the outer or inner cylinder surface of interest. Furthermore, it should be realized without further discussion that this is also absolutely true when the segments 24 are cross-sectionally configured to have circular arcs on the outer or inner cylinder surface of interest and are magnetized to have the magnetic orientation thereof directed in the same circular arc, as shown in FIG. 5. Consequently, when the cylinders 22 contain only segments 24 with triangular cross sections, the only poles existing in the magnetic circuit of the magnet structure 10' are those on the inner surface of a stator or the outer surface of a rotor and of course, only useful magnetic fields 18' are sustained by these poles. Those skilled in the magnetic arts will certainly understand from FIG. 5 that the above discussion also applies where segments 24 having triangular cross sections and radial magnetic orientations are alternately disposed in the cylinders 22 with segments 24 having trapezoidal cross sections and tangential or circular magnetic orientations.

When more than one cylinder 22 is disposed in the magnet structure 10', as shown in FIGS. 3 and 4, the cylinders 22 are coaxially aligned with the outer diameter of each cylinder 22 being substantially equal in magnitude to the inner diameter of the cylinder 22 adjacent thereto in the outer direction. The segments 24 of each cylinder 22 are configured and arranged in the same manner discussed above, to sustain a supporting magnetic circuit therein for the magnetic fields 18' that extend from only one cylindrical surface of the magnetic structure 10'. Furthermore, the poles on adjacent cylinders 22 are radially aligned N with N and S with S, so that the magnetic fields 18' between such poles add vectorially to derive enhanced field magnitudes from the magnet structure 10'. In the magnetic circuits of FIGS. 3 and 4, the magnetic fields 18' extend from only one cylindrical surface of the magnet structure 10'. However, the magnetic fields 18' extend from the outer cylindrical surface of the magnet structure 10' in FIG. 3 which therefore, would be incorporated on the rotor in electric machinery, while the magnetic fields 18' extend from the inner cylindrical surface of the magnetic structure 10' in FIG. 4 which therefore, would be incorporated on the stator in electric machinery.

Those skilled in the art will appreciate without any further explanation that within the concept of this invention, many modifications and variations are possible to the above disclosed embodiments of permanent magnet structures for electric machinery. Consequently, it should be understood that all such modifications and variations fall within the scope of the following claims.

What we claim is:

1. A permanent magnet structure for avoiding magnetic losses incurred from unutilized magnetic fields in electric machinery, comprising:
   at least one hollow cylinder of magnetically rigid material constructed with a plurality of segments having substantially triangular cross sections disposed in each said cylinder between segments having substantially trapezoidal cross sections, each said cylinder having a magnetic circuit which contains a plurality of magnetic fields extending from only one cylindrical surface thereof, with each said magnetic field passing between north and south poles on that cylindrical surface.

2. The magnetic structure of claim 1 wherein said magnetic fields extend only from the outer cylindrical surface of each said cylinder.

3. The magnetic structure of claim 1 wherein said magnetic fields extend only from the inner cylindrical surface of each said cylinder.

4. In electric machinery of the type having a rotor disposed within a stator and including a permanent magnetic structure for avoiding magnetic losses incurred from unutilized magnetic fields, the improvements comprising:

said permanent magnetic structure includes at least one hollow cylinder of magnetically rigid material constructed with a plurality of segments having substantially triangular cross sections disposed in each said cylinder between segments having substantially trapezoidal cross sections, each said cylinder having a magnetic circuit which contains a plurality of magnetic fields extending from only one cylindrical surface thereof, with each said magnetic field passing between north and south poles on that cylindrical surface.

5. The electric machinery of claim 4 wherein said permanent magnet structure is incorporated on said rotor, with said magnetic fields extending only from the outer cylindrical surface of each said cylinder.

6. The electric machinery of claim 4 wherein said permanent magnet structure is incorporated on said stator, with said magnetic fields extending only from the inner cylindrical surface of each said cylinder.

* * * * *